United States Patent
Tsai

(10) Patent No.: US 7,192,038 B2
(45) Date of Patent: Mar. 20, 2007

(54) FOOT PROPELLED SCOOTER

(75) Inventor: Sheue-Ing Tsai, 4F, No. 8, Lane 177, Sec. 1, Fu Hsing S. Road, Taipei City (TW)

(73) Assignee: Sheue-Ing Tsai, Taipei (TW)

( * ) Notice: Subject to any disclaimer, the term of this patent is extended or adjusted under 35 U.S.C. 154(b) by 584 days.

(21) Appl. No.: 10/216,829

(22) Filed: Aug. 13, 2002

(65) Prior Publication Data

US 2004/0032105 A1 Feb. 19, 2004

(51) Int. Cl.
   *B62M 1/04* (2006.01)

(52) U.S. Cl. .............................. 280/87.041; 280/87.05; 280/221

(58) Field of Classification Search .............. 280/87.05, 280/87.041, 87.03, 87.021, 87.01, 639, 655, 280/200, 210, 221, 252, 62
   See application file for complete search history.

(56) References Cited

U.S. PATENT DOCUMENTS

| | | | | | |
|---|---|---|---|---|---|
| 4,071,261 | A | * | 1/1978 | Winchell | 280/220 |
| 4,076,270 | A | * | 2/1978 | Winchell | 280/220 |
| 4,087,106 | A | * | 5/1978 | Winchell | 280/14.28 |
| 4,088,338 | A | * | 5/1978 | Winchell et al. | 280/220 |
| 4,123,079 | A | * | 10/1978 | Biskup | 280/87.042 |
| 4,133,551 | A | * | 1/1979 | Biskup | 280/221 |
| 4,165,093 | A | * | 8/1979 | Biskup | 280/220 |
| 4,230,331 | A | * | 10/1980 | Johnson | 280/218 |
| 4,540,192 | A | * | 9/1985 | Shelton | 280/282 |
| 5,039,121 | A | * | 8/1991 | Holter | 280/220 |
| 5,110,148 | A | * | 5/1992 | Stienbarger et al. | 280/221 |
| 5,785,331 | A | * | 7/1998 | Rappaport | 280/87.041 |
| 6,206,388 | B1 | * | 3/2001 | Ouboter | 280/87.042 |
| 6,220,612 | B1 | * | 4/2001 | Beleski, Jr. | 280/87.041 |
| 6,332,621 | B1 | * | 12/2001 | Wu | 280/87.041 |
| 6,334,838 | B1 | * | 1/2002 | Lee | 482/51 |
| 6,398,238 | B1 | * | 6/2002 | Shaw | 280/87.042 |
| 6,402,173 | B1 | * | 6/2002 | Chiu | 280/252 |
| 6,467,781 | B1 | * | 10/2002 | Feng | 280/87.01 |
| 6,485,039 | B1 | * | 11/2002 | Ming-Fu | 280/87.041 |
| 6,499,751 | B1 | * | 12/2002 | Beleski, Jr. | 280/87.041 |
| 6,554,302 | B1 | * | 4/2003 | Liu | 280/87.041 |

* cited by examiner

*Primary Examiner*—Christopher P. Ellis
*Assistant Examiner*—Jeff Restifo

(57) ABSTRACT

A structure of a foot propelled scooter is described. Because foot propelled scooter is put into motion by using foot oscillation, thus creating an effect of exercise and frolic to the rider. The foot propelled scooter has a steering handle which is operatively coupled to a set of front wheels, the steering handle is rotatable in a steering column, a retractable bar is pivotally attached to the steering column, an adjustable rear bar is adjustably and pivotally attached to the retractable bar, a foot frame having a set of wheels disposed underneath is pivotally mounted on each end part of the adjustable rear bar. A foot brake controllable by a foot is mounted on retractable bar. The rider swings both feet alternately in a forward and a backward direction to make a pushing contact to put the scooter into forward motion.

9 Claims, 5 Drawing Sheets

FOOT PROPELLED SCOOTER

BACKGROUND OF THE INVENTION

1. Filed of the Invention

The present invention relates generally to foot-board vehicle. More particularly to a foot propelled scooter. The foot propelled scooter of the present invention is inherently stable and highly safe, and is easy to operate. The foot propelled scooter of the present invention provides exercise and recreation to the rider, therefore, it is suitable for both adults and children.

2. Description of the Related Art

Exercising and playing recreational games has become very important part of our life to keep fit and healthy. The use of foot-board scooter is one of the most popular game among both adults and children because the foot-board scooter provides both good exercise and frolic to both adults and children. The foot-board scooter has also become a new fashion exercise or game, and widely accepted as favorable leisure sport for both adults and children. To operate the conventional foot-board scooter, a rider grasps the bar handle with both hands, rests one leg on the board of scooter and uses the other foot to make a pushing contact with the road surface repeatedly in order to propel the scooter in the forward direction. When the rider wishes to slow down or stop, the rider either stops pushing the scooter with one of the legs allowing the scooter to slow down and come to stop by itself or engages the skid brake which is disposed behind the hind wheel with the ground to slow down or stop the scooter. However, there are several drawbacks from using the conventional foot-board scooters, such as:

1. The rider has to use one of the legs to tread the ground repeatedly in order to keep the scooter moving in the forward direction. After traveling for a while, doing the pushing and trending action repeated over and over again to move the scooter in the forward direction would easily exhaust the rider in a short time, thus riding a foot-board scooter cannot be fun over a longer period of time.
2. The standing board of the conventional scooter has wheels on both front and back ends, and the space for the rider to rest the leg is too narrow, thus when the rider puts both the legs on the board can easily cause the scooter unstable due body oscillation causing the rider to lose balance and fall. Therefore the conventional scooter is inherently unstable and unsafe for the rider.
3. The brake of conventional scooters is located behind the hind wheel, and since the space on the board for the rider to stand on is very limited, therefore, attempt to apply the brake using the leg can easily throw the rider out of balance due to body oscillation. In this regard the conventional scooter less safe and dangerous.

As mentioned above, the conventional scooters have several defects due to its structural design as a whole. Thus there are several limitations, inconvenience and safety concerns while using the conventional scooters. Therefore, the need to create an improved foot-board scooter for overcoming the above defeats and produce a safe and recreational scooter is highly desirable.

SUMMARY OF THE INVENTION

Accordingly, in the view of the foregoing, the present inventor makes a detailed study of the related art to evaluate and consider, and uses years of accumulated experience in this field, and through several experiments, creates the foot-propelled scooter of the present invention. Thus the present inventor provides an inherently stable and safer scooter. The foot-propelled scooter of the present invention allows the rider to have adequate space for resting both the legs, thus the problem of loosing balance due to body oscillation can be effectively eliminated. The foot-propelled scooter of the present invention also allows the rider to move the scooter in the forward direction by moving the foot frame alternately in a forward and backward direction, thus the need for the rider to use one of the legs to push or tread the surface of the road in order to move the scooter can be effectively eliminated. Therefore the rider can enjoy and exercise for a longer duration of time.

According to one aspect of the present invention, a foot frame comprising an operative propelling mechanism is to used for moving the foot-propelled scooter. According to another aspect of the present invention, front wheels of the scooter positioned along a central axis in between the two foot frames, with each of the foot frames having a pair of wheels underneath. This design would provide a rider with an adequate space for resting each leg on each foot frame therefore the rider can gain fine balance allowing the rider to easily maneuver and propel the scooter and travel at a much faster speed. Thus present invention provides an inherently stable, safe and energy saving scooter.

According another aspect of the present invention, the foot-propelled scooter comprises a retractable bar is pivotally and retractably connected to the main frame plate of the steering column. The length of the retractable bar can be adjusted suiting rider's needs, such as rider's figure size. Thus the length of the retractable bar can be adjusted to suit almost every rider's figure and size.

According to another aspect of the present invention, a central area of an adjustable rear bar is pivotally connected to a distal section of the retractable bar allowing the adjustable rear bar to move forward and backward along the pivotal axis.

According to another aspect of the present invention, a foot frame having a pair of movable wheels underneath is pivotally connected to each end of the adjustable rear bar. In operation, the rider rests a foot in each of the foot frames and by swinging the legs in a forward and backward motion can easily propel the scooter in the forward direction. Further, this design also allows the rider to relax with the foot frames at a fixed position whenever needed.

According to another aspect of the present invention, the front wheels are engageable by a brake which is controllable by a hand lever is mounted on one of the hand bar. The lever is operatively coupled to the brake by a cable. This allows rider to control the speed and to stop the foot propelled scooter whenever desired.

According to another aspect of the present invention, a foot brake is mounted on the retractable bar. This also allows rider to control the speed and to stop the foot propelled scooter whenever desired.

According to another aspect of the present invention, because the retractable bar is pivotally and retractably connected to the main frame plate of the steering column, and because the rear bar is pivotally mounted on the retractable bar, therefore the foot propelled scooter of the present invention can be easily folded by retracting the retractable bar together with the adjustable rear bar and the foot frames against the steering column. Thus a smaller space is required to put away and store the foot propelled scooter of the present invention.

It is understood that the foregoing general description and the following detailed description are exemplary, but are not restrictive of the present invention.

BRIEF DESCRIPTION OF THE DRAWINGS

The present invention is best understood from the following detailed description when read in connection with the accompanying drawing. Included in the drawing are the following figures.

DESCRIPTION OF THE PREFERRED EMBODIMENTS

Figure 1:
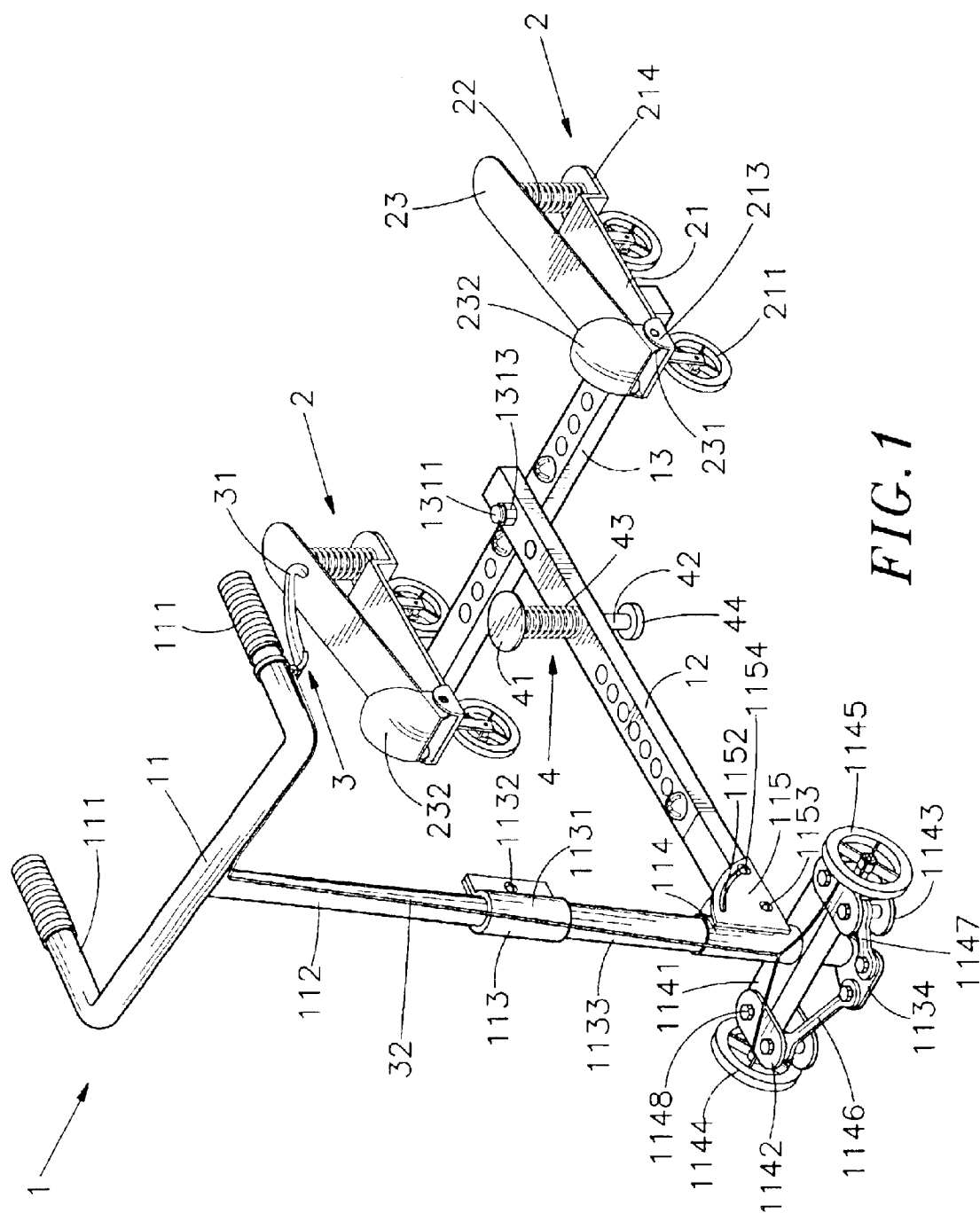
FIG. 1 is an elevational view of an foot propelled scooter according to a preferred embodiment of the present invention.

Reference will be made in detail to the preferred embodiments of the invention, examples of which are illustrated in the accompanying drawings. Wherever possible, the same reference numbers are used in the drawings and the description to refer to the same or like parts.

Figure 2:
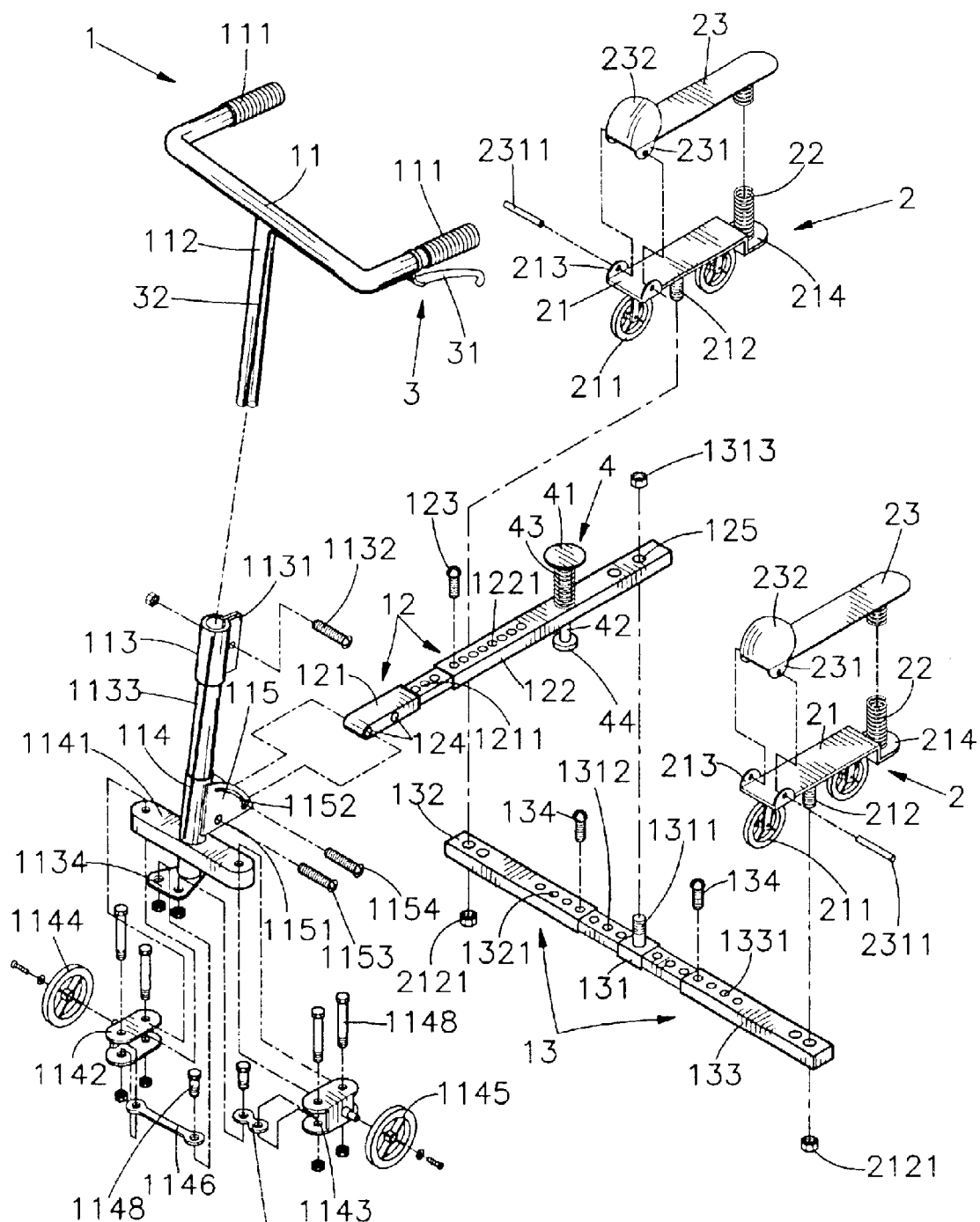
FIG. 2 is an exploded view of the foot propelled scooter according to a preferred embodiment of the present invention.
Figure 3:
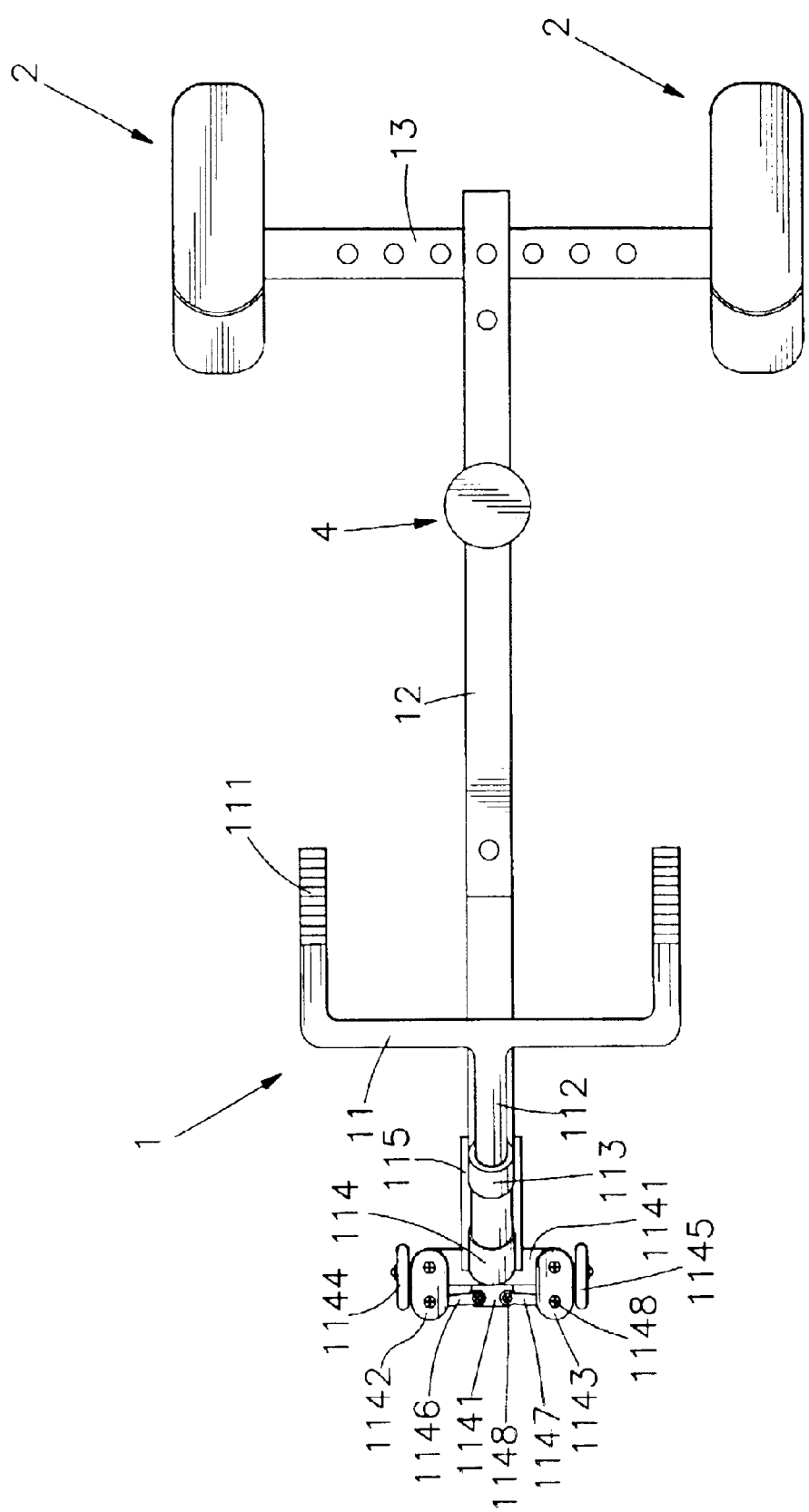
FIG. 3 is a top view of the foot propelled scooter according to a preferred embodiment of the present invention.

For a more complete understanding of the present invention, reference will now be made to the following detailed description of preferred embodiments taken in conjunction with the accompanying drawings, in which:

FIGS. 1, 2, 3 a foot propelled scooter 1 present invention is shown comprising a steering handle 11, a retractable bar 12, an adjustable rear bar 13, a pair of foot frame 2 for propelling mechanism, a foot brake 4, and a cable brake 3.

The steering handle 11 comprises a hand bar 111 on each end of the steering handle 11, a shaft 112 disposed in a center position with respect to the hand bars 111, the shaft 112 is adjustably coupled with a steering post 1133 using a clamp 113, a pair of clamp plates 1131 are located at the extended ends of the clamp 113 enabling to adjustably and securely fixing the shaft 112 position over the steering post 1133 by wing a fastener 1132. The clamp 113 allows a distal portion of the shaft 112 to extend up and down within the clamp 113, therefore this design allows adjusting the height of the steering handle 11 by moving the shaft 112 up and down and then securely fixing the shaft 112 into position over the upper end of the steering post 1133 by using the fastener 1132. The steering post 1133 is rotatable within a steering column 114. The lower end of the steering post 1133 comprises a steering plate 1134. The lower end of the steering column 114 comprises a wheel frame 1141. One end of a first directional element 1142 is pivotally connected to a first end of the wheel frame 1141 using a fastener 1148, and one end of a second directional element 1143 is pivotally connected to a second end of the wheel frame 1141 using a fastener 1148. The wheels 1144, 1145 are secured on the outer side of each directional element 1142, 1143. One end of a first directional arm 1146 is pivotally connected to a first end of the steering plate 1134 and the other end of the first directional arm 1146 is pivotally connected to the other end of the first directional element 1142, and one end of a second directional arm 1147 is pivotally connected to a second end of the steering plate 1134 and the other end of the second directional arm 1147 is pivotally connected to the other end of the second directional element 1143. Thus enabling the shaft 112, steering post 1133 and the steering plate 1134 to engage with the wheels 1144. 1145. Therefore the direction of the wheels 1144, 1145 motion can be controlled by controlling the steering handle 11. The steering column 114 further comprises a pair of retraction plates 115 disposed behind the steering plate 1134. The retraction plates 115 comprise an aperture 1151 and a retraction slit 1152.

The retractable bar 12 is pivotally connected to the retraction plates 115 of the steering column 114 in a such a manner that a frontal end of the retractable bar 12 is placed in between the retraction plates 115 and pivotally connected to the retraction plates 115 by inserting a fastener 1153 into the aperture 1151 of the retraction plates 115 and through the aperture 124 of the retractable bar 12 and securing the fastener 1153. Further the position of the retractable bar 12 can be fixed by using a faster 1154 on the retractable bar 12 and fixing it against the retraction adjustable slit 1152. The retractable bar 12 further comprises a frontal bar 121 and a distal bar 122, wherein a portion of the frontal bar 121 can be slided within the distal bar 122. A plurality of threaded apertures 1221 are disposed on the frontal bar 121 and distal end bar 122. The length of the retractable bar 12 can be adjusted by positioning the frontal bar 121 and the distal bar 122 to a desired length and fixing the frontal bar 121 with distal bar 122 by using fasteners 123 through the threaded apertures 1221.

The central bar 131 of the adjustable rear bar 13 is pivotably attached to the retractable bar 12 by using a fastener 1311 through an aperture 125 and securing the connection with a nut 1313. This design will enable the adjustable rear bar 13 to move axially with respect to the retractable bar 12. The adjustable rear bar 13 further comprises a central bar 131 left distal bar 132 and a right distal bar 133. A portion of the central bar 131 can slide within the left and right distal bars 132, 133. A plurality of threaded apertures 1312 are disposed on the central bar 131 and a plurality of threaded apertures 1321 are disposed on the left distal bar 132 and a plurality of threaded apertures 1331 are disposed on the right distal bar 133 of the adjustable rear bar 13. The length of the adjustable bar 13 can be adjusted by positioning the left and right distal bars 132 and 133 to a desired length and then fixing the left and right distal bars 132 and 133 to the central bar 131 by using fastener 134 through one of the threaded apertures 1321 on the left distal bar 132 and through one of the threaded apertures 1331 on the right distal bar 133.

Each foot frame 2 is pivotally attached to each end of the adjustable rear bar 13. The distance between the foot frames 2 can be adjusted to a desired range according to the rider's figure and size by adjusting the adjustable rear bar 13. Each foot frame 2 comprises a base plate 21, resilient elements 22, a base plate 23, and a pair of wheels 211 beneath the base plate 21 (the wheels 211 may be one or more than one), and the direction of the wheels 211 can be changed freely. Each of the foot frame 2 is pivotally attached to a end part of the left and right distal bars 132, 133 by passing an axle 212 which is located on the lower surface of the base plate 21 through the threaded aperture 1321 of the left distal bar 132 (and through the threaded aperture 1331 of the right distal bar 133) and then pivotally fixing the axis 212 with the left and right distal bars 132, 133, by using a nut 2121. The upper surface of the base plate 21 comprises a foot plate holder 213 at one end, and the resilient base plate 214 at the other end. One end of the resilient element 22 is fixed onto the upper surface of the resilient base plate 214, and the other end is fixed to a lower surface at a distal portion of a bracket 232. At a lower surface and in a frontal end of the foot-plate 23 there is a bracket holder 231. A bracket 232 is pivotally attached to the bracket holder 231 by passing an axle 2311 through the apertures of the bracket 232, the bracket holder 231 and the foot plate holder 213 as shown in the FIG. 2. This would enable the foot plate 23 operationally for fixing the foot of the rider at the frontal end of the base plate 21.

The front wheels 1144, 1145, are engageable by a brake which is controllable by a hand lever 31. The hand lever 31 is mounted on one of the hand bar 111 of the steering bar 11 through a cable brake 3. The hand lever 31 is operatively coupled to the cable brake 3, and the brake by a cable 32. The cable 32 is extended from the hand lever 31 downwardly along the steering handle 11 to the frontal wheels 1144, 1145 and connecting with the brake 3. This allows the rider to control the speed and stop the foot propelled scooter 1 whenever the rider desires.

The foot brake 4 is operatively mounted on the retractable bar 12. The foot brake 4 comprises a brake pad 44, which will engage with the surface of the road when the rider steps on a plunger 41 of the foot brake 4. The brake pad 44 is attached at a lower end surface of a shaft 42 which extents from the lower surface of the plunger 41. The shaft 42 passes through a resilient element 43, which resilient element 43 is positioned between an upper surface of the retractable bar 12 and the bottom surface of the plunger 41. The function of the resilient element 43 is position the brake pad 44 away from the surface of the road and not to engage with the surface of the road when the rider does not step on the plunger 41. The foot brake 4 also allows rider to control the speed and to stop the foot propelled scooter 1 whenever the rider desires.

Figure 4:
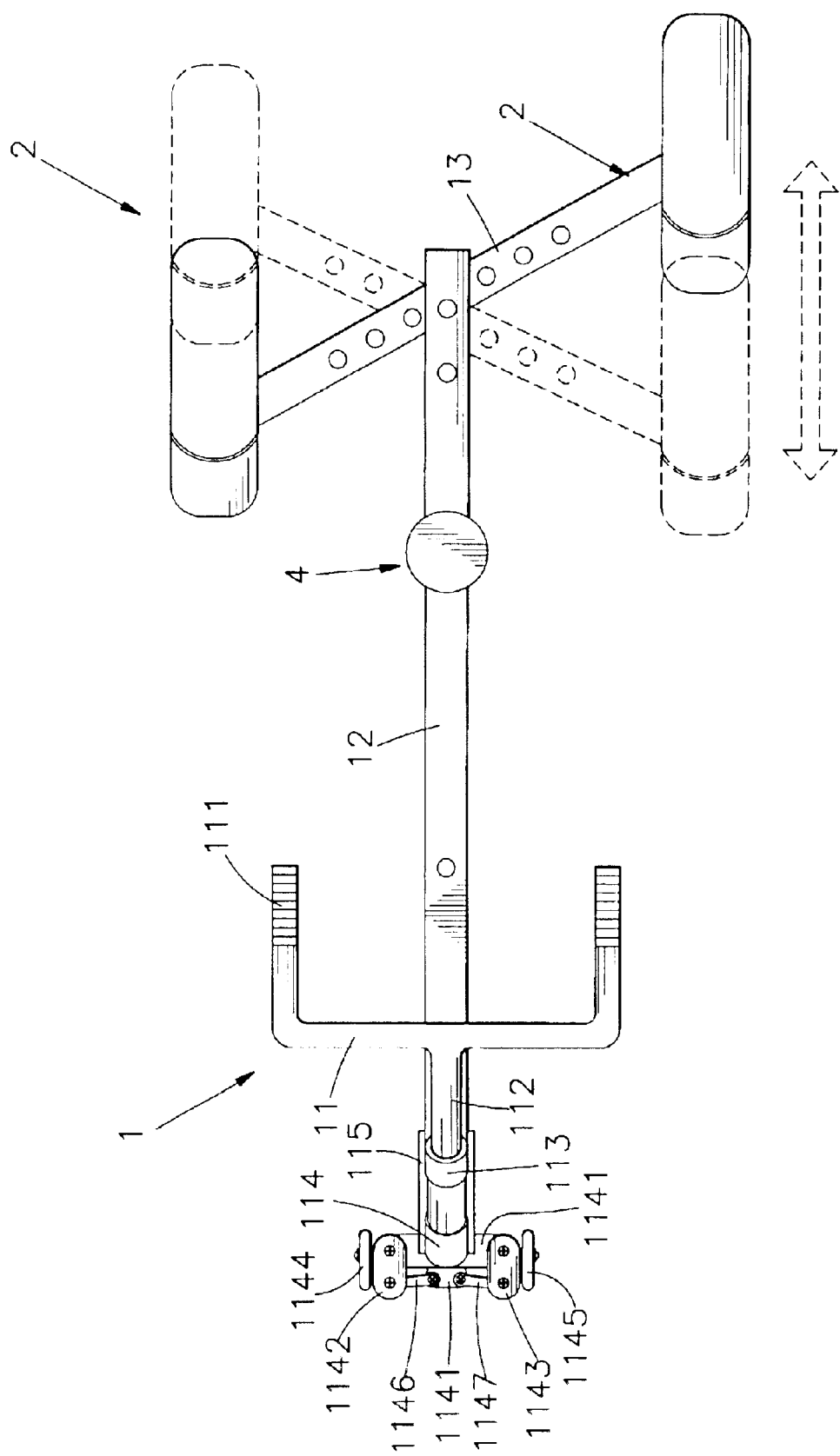
FIG. 4 is a top view of the foot propelled scooter showing the oscillatory motion of the foot frame to put the scooter in forward motion, according to a preferred embodiment of the present invention.

To operate the foot propelled scooter 1 of the present invention, the rider uses both hands to hold the hand bars 111 of the steering handle 11, and puts one leg separately onto the feet plate 23 of the foot frame 2 located on two ends of the adjustable rear bar 13, the front part of rider's foot will fit into the arch-shaped bracket 232 of foot plate 23. Thus the rider's feet can be held onto the foot plate 23 and at the same time the foot makes a contact with the foot plate 23 can be secured for facilitating the rider to operate the foot frame 2 in order to move the foot propelled scooter 1 in the forward direction. The rider moves both legs alternatively forward and backward direction to make the pushing contact with the surface of the road to initiate movement of the foot propelled scooter 1 (as the FIG. 4 shows), in order to put the foot propelled scooter 1 into action and move forward. While in motion, the rider can grasp the hand lever 31 of the brake 3 which located on one of the hand bar 111 (as shown in FIG. 1) to slow down or stop the foot propelled scooter 1. Alternatively, the rider may use one foot to step on and press down the plunger 41 of the foot brake 4 to engage the brake pad 44 with the surface of the road, thus generating a resistance force due to the friction between the brake pad 44 and the road surface to slow down or stop the foot propelled scooter 1.

Still referring to FIG. 1 and 2, as it can be clearly seen that the length of the retractable bar 12 can be adjusted from front to the back and the length of the adjustable rear bar 13 can be adjusted from the right to the left as desired to suit the figure and size of the rider. To the extent, the rider may release the fastener 123 of the retractable bar 12 of the foot propelled scooter 1, then change the position of the frontal bar 121 and distal end bar 122 (by extended outwardly or shrinking inwardly), and then fasten fastener 123 into the appropriate threaded aperture 1211 of the frontal bar 121 and the appropriate threaded aperture 1221 of the distal end bar 122 when the position of both bars creates the rider's desired length. Further, the rider may also release the adjustable rear bar 13 from the retractable bar 12 to adjust the distance of the adjustable rear bar 13 from the steering wheel 11. Furthermore, the rider may also release the fastener 134 of the left and right distal bars 132, 133, of the adjustable rear bar 13 to adjust the distance of the foot frames 2 suiting the rider's figure and size. To the extent, the length of the adjustable rear bar 13 can be adjusted by adjusting the position of the left distal bar 132 from the central bar 131 and the similarly by adjusting the position of the right distal bar 133 from the central bar 131 and then fastening the fastener 134 into the appropriate threaded aperture 1321 of the left distal bar 132 and the appropriate threaded aperture 1331 of the right distal bar 133. Thus the length of the retractable bar 12 can be adjusted from front to the back and the length of the adjustable rear bar 13 of the foot propelled scooter 1 can be adjusted from the right to the left as desired to suit the figure and size of the rider.

Figure 5:
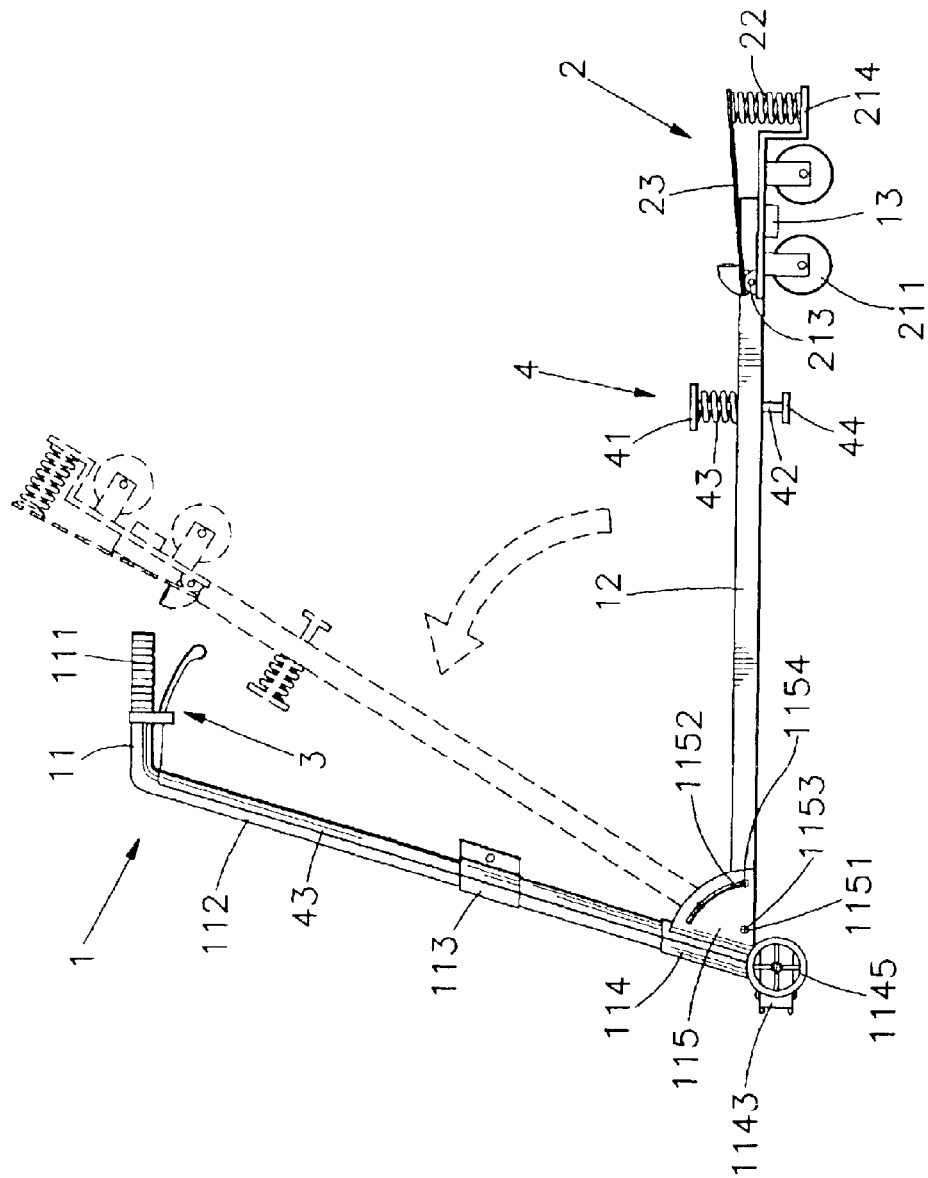
FIG. 5 is a side view of the foot propelled scooter showing the retraction of the foot propelled scooter for storage when not in use, according to a preferred embodiment of the present invention.

Referring to FIG. 5, shows a side view of the foot propelled scooter 1 showing how the foot propelled scooter 1 of the present invention can be folded for storage. The rider can loosen the fastener 1154 on the retraction slit 1152 of the retraction plates 115, then push the retractable bar 12 together with the adjustable rear bar 13 and the foot frames 2 against the side of the steering handle 11. The retractable bar 12 is retracted by rotation through the axis 1151 and meanwhile the fastener 1154 in the retraction slit 1152 will be pushed up to the upper end position of the retraction slit 1152. Then fastener 1154 in the upper end position is secured in order to secure the retractable bar 12 onto the side of the control handle 11, thus the space required for storing the foot propelled scooter 1 can be substantially reduced and thus can be stored more conveniently.

While the invention has been described in conjunction with a specific best mode, it is to be understood that many alternatives, modifications, and variations will be apparent to those skilled in the art in light of the a foregoing description. Accordingly, it is intended to embrace all such alternatives, modifications, and variations which fall within the spirit and scope of the included claims. All matters set forth herein or shown in the accompanying drawings are to be interpreted in an illustrative and non-limiting sense.

What the invention claimed is:

1. A foot propelled scooter comprising:
    a steering handle, comprising a hand bar on two ends of the steering handle, a set of front wheels disposed below the steering handle, wherein said set of wheels are operatively coupled to the steering handle, and the steering handle is rotatable within a steering column and wherein the steering column comprises a pair of retraction plates;
    a retractable bar, pivotally attached to the retraction plates of the steering column, extending rearwardly from the retraction plates;
    an adjustable rear bar, pivotally attached to a distal end of the retractable bar, enabling a junction part to move axially;
    two foot frame, pivotally attached to opposite ends of the adjustable rear bar, wherein a set of wheels are disposed on the underside of the foot frame, enabling a rider to rest each fool into each foot frame and to swing both feet alternately in a forward and a backward direction in order to create a pushing contact with a road surface; and a brake operatively mounted on the foot propelled scooter enabling the rider to control a speed for slowing down or stopping said foot propelled scooter while in motion.

2. The foot propelled scooter according to claim 1, wherein the foot frame comprises a foot plate, a frontal end of said foot plate comprises an arch-shaped bracket for fitting the riders foot and enabling the rider to swing to both feet alternately in a forward and a backward direction so that the wheels under the two foot frames engage with a road surface to create a pushing force to propel the foot propelled scooter in forward motion.

3. The foot propelled scooter according to claim 1, wherein the retractable bar comprises a frontal end bar and a distal end bar, and wherein the frontal end bar and distal end bar comprises a plurality of threaded apertures, a portion of the frontal end bar is slidable into the distal end bar, and by inserting a fastener into an appropriate threaded aperture of said distal end bar and through an appropriate threaded aperture of said frontal end bar and securing the fastener, the length of the retractable bar can be adjusted.

4. The foot propelled scooter according to claim 1, wherein the adjustable rear bar comprises a central bar, a left distal bar and a right distal bar, wherein at a central section of the central bar comprises a partially threaded central axle for pivotally coupling with the retractable bar, the central bar, the left distal bar and the right distal bar comprise a plurality of threaded apertures, a portion of central axle is slidable into the left distal bar and the right distal bar, and by inserting a fastener into an appropriate threaded aperture of the left distal bar and through an appropriate threaded aperture of the central bar and securing said fastener, and inserting a fastener into an appropriate threaded aperture of the right distal bar and through an appropriate threaded aperture of the central bar and securing said fastener, the length of the adjustable rear bar can be adjusted.

5. The foot propelled scooter according to claim 1, wherein the brake, which is controllable by a hand lever is mounted on one of the hand bars of the steering handle is operatively coupled to the set of front wheels through a cable that extends from the hand lever downwardly along the steering handle to the set of front wheels.

6. The foot propelled scooter according to claim 1, wherein the retractable bar comprises a foot brake, the foot brake comprises a plunger, a shaft extending downwardly from the plunger passing through a resilient element and an aperture of the retractable bar, and the lower end surface of the shaft comprises a brake pad.

7. The foot propelled scooter according to claim 1, wherein the retraction plates comprises a pivotal aperture and a retraction slit, the retractable bar is pivotally attached to the retraction plates by inserting a fastener through the pivotal aperture and through an aperture in the frontal end bar of the retractable bar and securing the fastener, and secure the position of the retractable bar by securing a fastener on the retractable bar against the retraction slit.

8. The foot propelled scooter according to claim 7, wherein when the foot propelled scooter is not in operation, the fastener on the retractable bar against the retraction slit can be loosened and the retractable bar together with the adjustable rear bar can be pushed against the steering handle, the retractable bar together with the adjustable rear bar rotates along the pivotal aperture axis and at the same time the faster on the retractable bar against the retraction slit moves upward along the retraction slit, the faster on the retractable bar against the retraction slit can be secured to secure the retractable bar onto the side of the steering handle.

9. The foot propelled scooter according to claim 1, wherein the steering handle comprises:

a shaft, adjustably clamped to a steering post, and the steering post which is located below the clamp is rotatable in a steering column;

a wheel frame, attached at the bottom of the steering column, one end of a first directional element is pivotally attached to a first end part of the wheel frame and one end of a second directional element is pivotally attached to a second end part of the wheel frame, a wheel attached on the lateral side of the first directional element and the second directional element;

a steering plate, attached at the bottom of the steering post;

one end of a first directional arm, pivotally attached to a first end of the steering plate and the other end of the first directional arm is pivotally attached to the other end of the first directional element of the wheel frame; and one end of a second directional arm, pivotally attached to a second end of the steering plate and the other end of the second directional arm is pivotally attached to the other end of the second directional element of the wheel frame.

* * * * *